Aug. 8, 1939.   H. S. TURNER   2,169,077
AUTOMATIC ELECTRIC CONTROL FOR LIQUID FUEL BURNERS
Filed June 24, 1936   6 Sheets-Sheet 1

WITNESSES
Ralph S. Voorhees
William L. Tucker

Hubert S. Turner
INVENTOR

Aug. 8, 1939.   H. S. TURNER   2,169,077
AUTOMATIC ELECTRIC CONTROL FOR LIQUID FUEL BURNERS
Filed June 24, 1936   6 Sheets-Sheet 2

WITNESSES
Ralph S. Voorhees
William L. Tucker

Hubert S. Turner
INVENTOR

Aug. 8, 1939.                H. S. TURNER                2,169,077
           AUTOMATIC ELECTRIC CONTROL FOR LIQUID FUEL BURNERS
                    Filed June 24, 1936        6 Sheets-Sheet 3

Hubert S. Turner, INVENTOR.
BY Thompson Hill.
ATTORNEY.

Aug. 8, 1939.     H. S. TURNER     2,169,077
AUTOMATIC ELECTRIC CONTROL FOR LIQUID FUEL BURNERS
Filed June 24, 1936     6 Sheets-Sheet 5

WITNESSES

INVENTOR.
Hubert S. Turner

Patented Aug. 8, 1939

2,169,077

UNITED STATES PATENT OFFICE 2,169,077

AUTOMATIC ELECTRIC CONTROL FOR LIQUID FUEL BURNERS

Hubert S. Turner, New York, N. Y.

Application June 24, 1936, Serial No. 86,999

19 Claims. (Cl. 158—28)

This invention comprises a modification of my Temperature and pressure control system, United States patent application Number 29,270, filed July 1, 1935. This modification is designed to automatically control heating devices using liquid fuel.

The essential features of this invention are the safety means used which prevents explosions and conflagrations due to volatile vapors in the combustion chamber of the heating device, by making an accumulation of such vapors a physical impossibility. Heretofore, a weakness in all other such automatic control systems has been that the device used to shut off the fuel supply in case of faulty ignition or loss of flame after ignition, has operated on a time interval, which not only often varies but is such that oil mist or vapor or gas, produced from the unignited fuel, would fill the combustion chamber and sometimes the breeching and flue. On re-starting the liquid fuel burning device, or if the temperature of the combustion chamber is sufficient, this accumulated mist, vapor or gas explodes, being a fire hazard well known to those practiced in the art.

The safety means used in this invention comprises a valve in the fuel pipe which closes instantly in case of faulty ignition, loss or increase of flame and even if the air condition in the combustion chamber varies from normal in any way. The action of this valve is not dependent on any time interval before operating.

Another frequent source of danger in the use of liquid fuel burners, is the temporary, partial or complete stoppage of the air inlet, or a broken fan blade, or a slowed down motor, causing a lack of sufficient air in the combustion chamber to support normal combustion. No means are provided to shut-down the burner under these conditions, except in my present invention. Instead of a stoppage in the air inlet, it may be in the air outlet, such as the flue or chimney; when fuel oil is used, this causes an extremely smoky flame, even if the stoppage is only partial. My invention shuts off the fuel supply instantly if this occurs and then the air supply.

Many oil burners have another defect; namely, the oil and air supply are cut off simultaneously. This means that expanding oil in the fed line between the pump and the spray nozzle oozes out of the latter and burns without adequate air, producing smoke, soot and fumes. In my invention means are provided whereby air is blown through the combustion chamber prior to opening and subsequent to closing the fuel valve, thereby thoroughly scavenging the chamber, preventing the formation of carbon on the spray nozzle and allowing the starting of the burner with fresh and adequate air.

Heretofore, automatic controls, as used in liquid fuel burners, have comprised instrumentalities attached to various parts of the boiler; such as a steam pressure control, low water cut-off and flame control. Furthermore, to control the burner are attached thereto or mounted adjacent, a relay device operated by the thermostat and a time interval device operating in conjunction with the boiler flame control. Such a scattered collection of devices necessitates considerable labor and expense in installation and offers another hazard to operation, on account of the exposure of the devices and wiring. In the system of this invention, all the control means cited are housed in one metal box mounted on the burner or adjacent thereto.

Means are also optionally provided, in case of any defect in the burner operation, for allowing re-cycling of the starting procedure for a predetermined number of times, and then only to so shut down the entire installation that it can only be started manually. This can be done with perfect safety in my new system on account of the means used to prevent oil or fuel accumulation in the combustion chamber. When such a shut-down occurs an alarm signal may be given at any desired location. Most liquid fuel burner makers do not dare to allow such re-cycling, on account of the danger of an explosion or fire from igniting the accumulation of oil vapor.

Another weak point in the usual operation of liquid fuel burners is the heat loss entailed after the burner has shut-down, due to the natural draft through the combustion chamber and flue, by comparatively cool air from the outside of the heating device. I overcome this loss by closing a damper in the flue whenever the burner is not operating, thereby conserving the heat remaining in the combustion chamber and in the water of the boiler.

Referring to the drawings, which are a part hereof:

Figure 1:
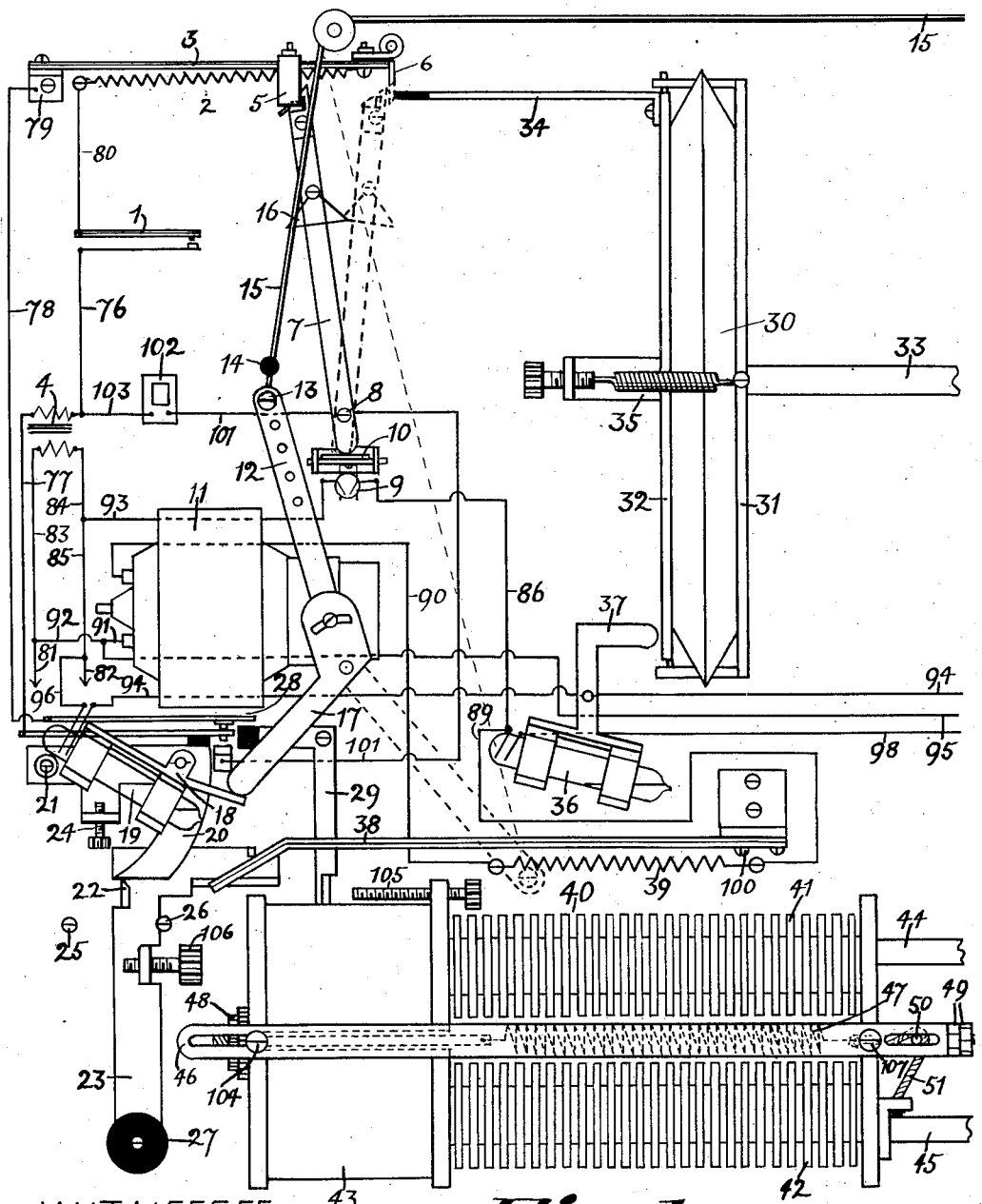
Figure 1 represents my control system as used with a burner.

In Figure 1 the time-lag means, or thermal relay and motor controlled thereby, are fully described in my mentioned co-pending application, to which reference should be had for a full description. While I am re-showing the same here as the preferred adjunct to the liquid fuel burner control system, described and shown herein, it will become clear as the description proceeds, that this control system could readily be applied to other devices comprising a motor and means for starting and stopping same by part revolutions of its driving shaft.

Describing only the essentials, in order to make its operation clear herein, the thermal relay operates in conjunction with a thermostat 1. A heating coil 2 is mounted below a bimetallic strip 3 which distorts downward when heated. A transformer 4 produces six to twelve volts on its secondary when connected to a source of alternating current. A stop 5 and a swinging hinged latch 6 are fastened to strip 3. A switch operating lever 7 is mounted on fulcrum 8 and is adapted to fall to the left or right by gravity whenever it is off the perpendicular, its movement being limited by the positions of stop 5 and latch 6. A mercury switch 9 is fastened underneath swinging piece 10, which latter is held approximately level by the end of lever 7 below fulcrum 8, except when lever 7 is not controlled by stop 5 or latch 6.

An electric motor 11 comprises a speed reduction gear to which arm 12 is attached and the latter revolves in a counter-clockwise direction. Attached to stud 13 on arm 12, through insulating button 14, is wire, cord or chain 15, which passes through loop 16 attached to lever 7. The holes shown in arm 12 are for adjusting the length of the pull on wire 15 by changing the position of stud 13. Another arm 17 is also attached to the driving shaft of motor 11 and the free end of this arm is adapted to engage the end of the pivoted tilting piece 18. By means of the set screw in the slot in arm 17, the latter is adjusted to release piece 18 immediately after the starting of motor 11.

Mercury tube 19 is placed in piece 18 in such a way that when arm 17 is engaged therewith, the tube contacts are open. Piece 18 is pivoted on the free end of piece 20 and moves freely thereon. Piece 20 is pivoted at fulcrum 21 and moves freely thereon, falling downward when not checked by the curved angle piece resting on lug 22 of angle piece 23. The fall of tilting piece 18, when released by arm 17, is checked by adjusting screw 24, the position being just sufficient to immerse the contacts of mercury switch 19 in the mercury. Angle piece 23 moves to the left freely, turning on fulcrum at 27 and its side motion is controlled by stops 25 and 26.

An insulating button 27 is fastened at the fulcrum of angle piece 23. This button extends forward through the cover of the control box, and by turning it clockwise resets piece 20 and angle piece 23, the pointed lower end of the curved arm of piece 20 resting against the right side of lug 22, when angle 23 is resting against stop 25, being forced to the right and also upward, as is shown clearly in Figure 4. A switch 28 is controlled jointly by the insulating button on top of piece 20 and that on the horizontal end of angle 29. A bellows 30 has one side 31 rigidly fastened to a base and the other side 32 pivoted at the rear, the two pivots acting like the hinges of a door, so that when pressure is exerted through the connected pipe 33, the front edge of side 32 moves to the left, like a door opening, as is shown clearly in Figure 4. This bellows 30 is made very large and light and expands and contracts with very slight pressure changes. The expanding material between sides 31 and 32 is preferably of fine kid leather or the like. The free, insulated end of arm 34, attached at the top of side 32 of bellows 30, swings in front of and passes to the rear of latch 6, when bellows 30 is fully inflated. A spring 35, with its adjusting screw, provides the means of closing the bellows when the pressure in tube 33 falls below a predetermined point. Spring 35 also controls the expansion of bellows 30 and the passing of latch 6 by arm 34 at a predetermined pressure point. A mercury switch 36 is operated by the described inflation of bellows 30, due to its mounting on angle 37 which bears against side 32. Mercury tube 36 is mounted so that its contacts are open when the bellows is contracted.

Another bimetallic strip 38 is mounted above another heating coil 39 and expands upward when heated. A combined steam pressure and low-water cut-off is shown at 40. It comprises two metal bellows 41 and 42, attached to a metal header 43. Pipe 44 connects with bellows 41 and pipe 45 to bellows 42. On each side of header 43 and extending between bellows 41 and 42, is a prong of forked piece 46, the connecting bar of this forked piece passing behind the bellows at the right of the device. Centered between bellows 41 and 42 and also centered between the two prongs of forked piece 46 is a coiled spring 47, shown by dotted lines. Tension on spring 47 is varied by adjusting nuts 48, which operate on a threaded rod which passes through a tube in the center of header 43, as also shown by dotted lines. Nuts 49, mounted in the center of the connecting bar of forked piece 46, control the movements of roller 50 in its slots. Attached to spring 47 at its right end is flexible cord or chain or wire 51, which passes over roller 50 to its anchorage on the base as shown.

Figure 2:
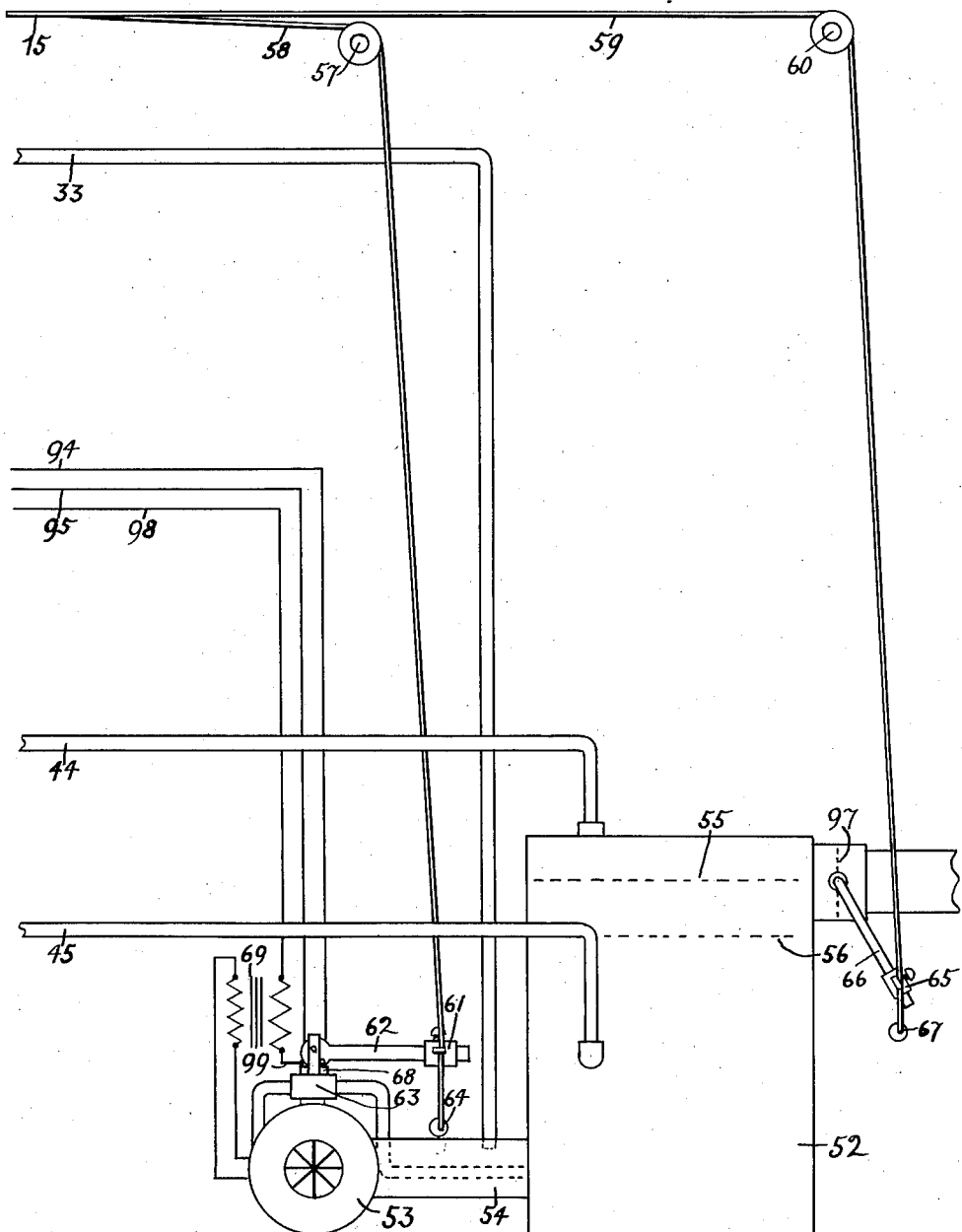
Figure 2 represents a conventionalized oil burner installation in a boiler, showing the connections from Figure 1.

In Figure 2, 52 is a boiler to which is attached an oil burner 53. Pipe 33 is the same pipe as 33 in Figure 1, but is shown in reduced size, on account of the different scale to which Figure 2 is drawn. Pipe 33 is connected to air entry tube 54 at any point between the blower fan and the boiler, but preferably nearer the boiler, as shown. Pipes 44 and 45 are connected to boiler 52 approximately as shown. These pipes are the same as pipes 44 and 45 in Figure 1. Pipes 33, 44 and 45 would normally be of about one quarter inch in inside diameter. Pipe 44 must enter the boiler above the normal water line, as shown by dotted line 55 and pipe 45 below the level set for the cut-off point, as shown by dotted line 56. Low-water cut-off 40 must be mounted level and in such a way that the bottom of pipe 45, as it enters the bellows, is on a level with the desired low-water line 56. Pipe 45 must be level or pitched down from bellows 42 to boiler 52. Wire, cord or chain 15 is a continuation of the same in Figure 1. Prior to reaching pulley 57, wire 13 is connected to two branches, wires 58 and 59, one passing over pulley 57 and one over pulley 60. Wire 58 passes through an eye or loop on counterweight 61, which is mounted on lever 62 of oil valve 63, and ends in a small counterweight 64. Wire 59 passes through an eye or loop on counterweight 65 which is mounted on damper control lever 66 and ends in a small counterweight 67. The fuel pipe, which conveys fuel to the spray nozzle in the combustion chamber of boiler 52, is shown by dotted lines inside air entry tube 54. Oil valve 63 and the pipes connected thereto are shown abnormally enlarged for sake of clearness in the drawings. Oil valve 63 is of the plunger or needle valve type, the vent being opened or closed by the up or down movement of plunger 68. Resting on plunger 68 is the circular end of lever 62. This circular end is eccentrically mounted as shown, so that when lever 62 is raised, plunger 68 rises slowly at first and then increases its speed, though lever 62 is raised at a constant speed, until the valve is fully open. The change of speed for a given fuel oil burner, is obtained by arranging the corresponding eccentricity of the circular part of lever 62. When the pressure exerted on plunger 68 by lever 62 is released, plunger 68 is raised by the oil pressure or a spring, according to the type of valve used. A sparking transformer is shown at 69, the secondary being connected to the sparking points of the burner inside the combustion chamber, in a manner well known in the art.

Figure 3:
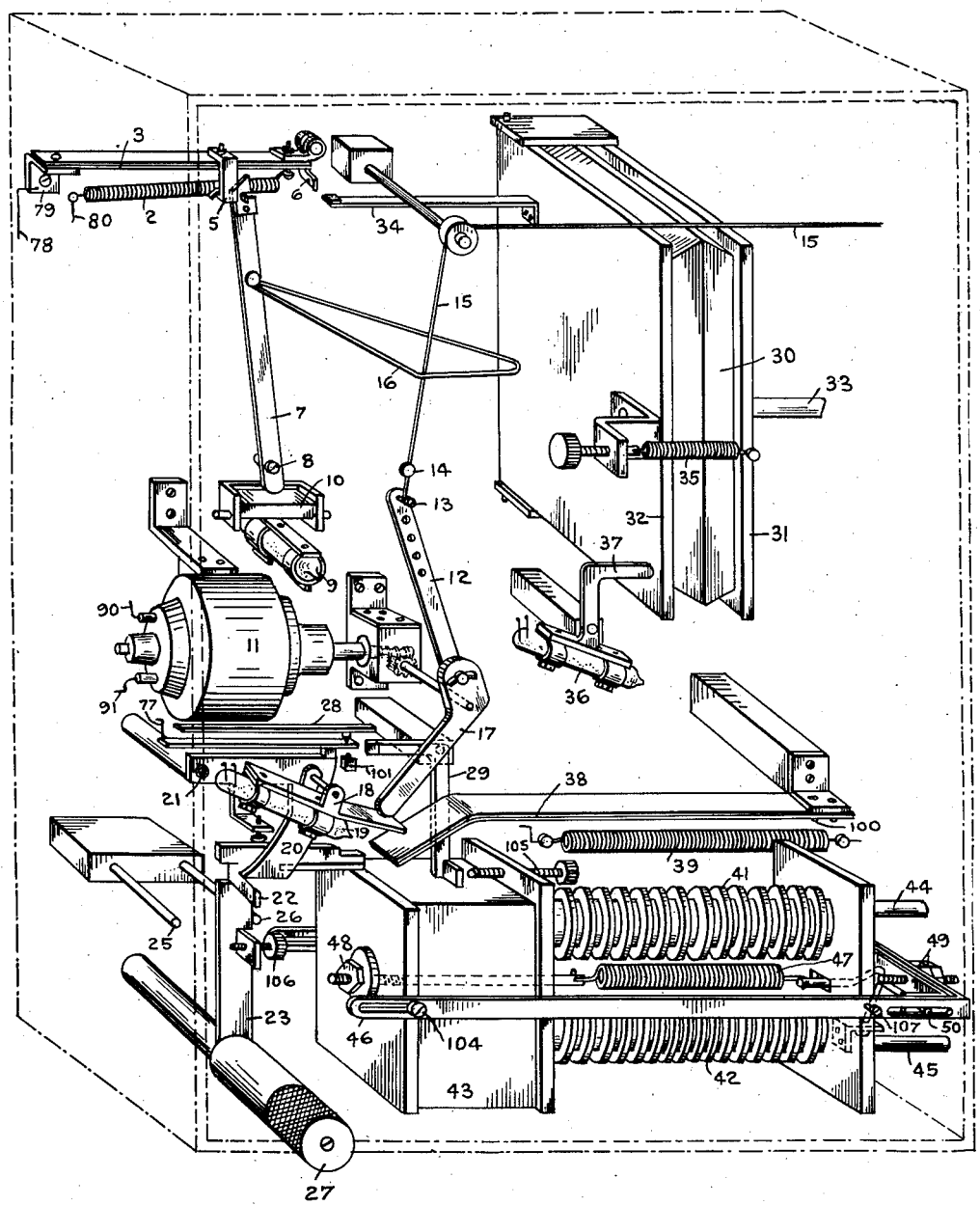
Figure 3 is a perspective view of the apparatus shown diagrammatically in Fig. 1.
Figure 7:
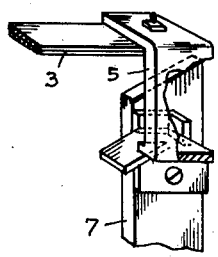
Figure 7 is a perspective view of part of the appliance shown in the upper left-hand portion of Figure 3.

Figure 3 shows a different way of ignition from the ordinary sparking method, which may be used with this system, though it would not be adaptable to others. A pipe 70 has on its end an ordinary spray nozzle 71. Over this pipe is placed an electrically but not heat insulating sleeve 72 and over this sleeve is wound a length of high resistance wire 73, capable of becoming hot almost instantly when connected to a 110 or 220 volt circuit. Over this wire is placed a heat insulating sleeve 74, capable of confining the generated heat to tube 70. A heating coil 75 surrounds an asbestos wick and is placed underneath the orifice of nozzle 71 in the combustion chamber of the boiler. Heating coil 75 is connected in multiple with wire 73. The wick in coil 75 rests in a small container, as shown.

Figure 4:
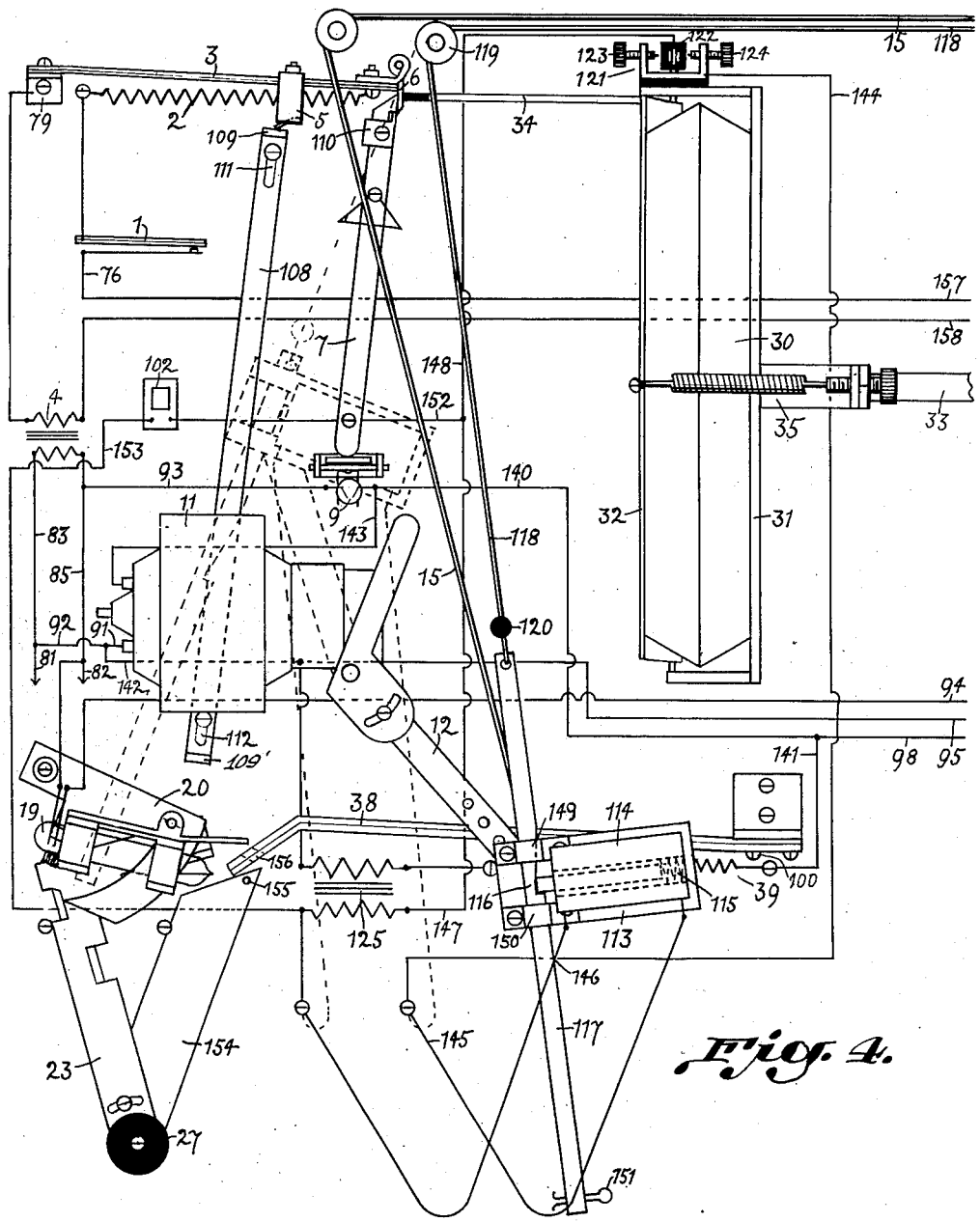
Figure 4 represents an alternative form of the system in Figure 1.

In Figure 4, all the parts shown are in their operated condition and all have some alternative changes in their construction and method of operation. Only the new parts shown will be described. Emergency cut-off stop 108 comprises a metal strip turned up at each end in the form of lugs extending forward. The top lug 109 is adapted to engage lug 110 on the free end of lever 7. Lug 110 engages lug 109. The bottom lug on the strip is adapted to rest on top of piece 20, when the latter is in its normal position as shown in Figure 1. Stop 108, when not supported by piece 20, falls by gravity and moves freely upward when pushed up by piece 20, due to the two screws which fit loosely in slots 111 and 112. Lugs 109 and 110 cannot engage when the stop is pushed upward.

Arm 12 of motor 11 bears on its outer end a latch device 113, comprising a solenoid 114 which has a spiral spring 115 behind the plunger, as shown by dotted lines. The plunger of solenoid 114 is pressed out by spring 115 and it engages the recessed portion or latch 116 of square rod 117. Latch device 113 is pivoted on the end of arm 12 and turns freely on this pivot. Wire 15 is connected directly to the pivot underneath latch device 113 and on the same side of arm 12. Wire 15 turns freely on this pivot. Another cord, wire or chain 118 runs over another pulley 119 and through insulating button 120 is connected to the upper end of rod 117. The described position of latch device 113 is that taken when the burner is operating. The position taken when the burner is not operating is shown by dotted lines.

Bellows 30 is shown expanded, with arm 34 resting against latch 6. Instead of bellows 30 operating mercury switch 36, as in Figure 1, a different switching device 121 is employed. Switch 121 is preferably mounted at the top of the bellows, as shown. An arm 122 of insulating material is mounted on the top hinge pivot of bellows 30, so that it swings freely from side to side, in conformity with the movements of side 32. Arm 122 is mounted so that when bellows 30 is expanded normally, the electrical contacts borne by the arm are centered between the electrical contacts borne by adjusting screws 123 and 124. Spring 35 is shown fastened to its adjusting screw on the right, rigid side of bellows 30. This is a preferable mounting as it places less strain on the sensitive moving side 32. Transformer 125 is used to obtain low voltage current for latch device 113 and switch 121 which controls it. However, the voltage of leads 81 and 82 may be used, dispensing with the transformer.

Piece 20 is shown in its lowered position, angle 23 in its position to the left. At the right side of angle 23 is fastened stop 154, which bears a pin 155 at its upper end. When strip 38 is in its normal position, as shown in Figure 1, pin 155 is adapted to pass through channel 156, which is cut at the back of strip 38, as shown by the dotted lines. When strip 38 is distorted upward, as shown in Figure 4, then pin 155 passes underneath the free end of the strip and prevents the distortion downward of the strip below the pin.

Figures 5, 6:
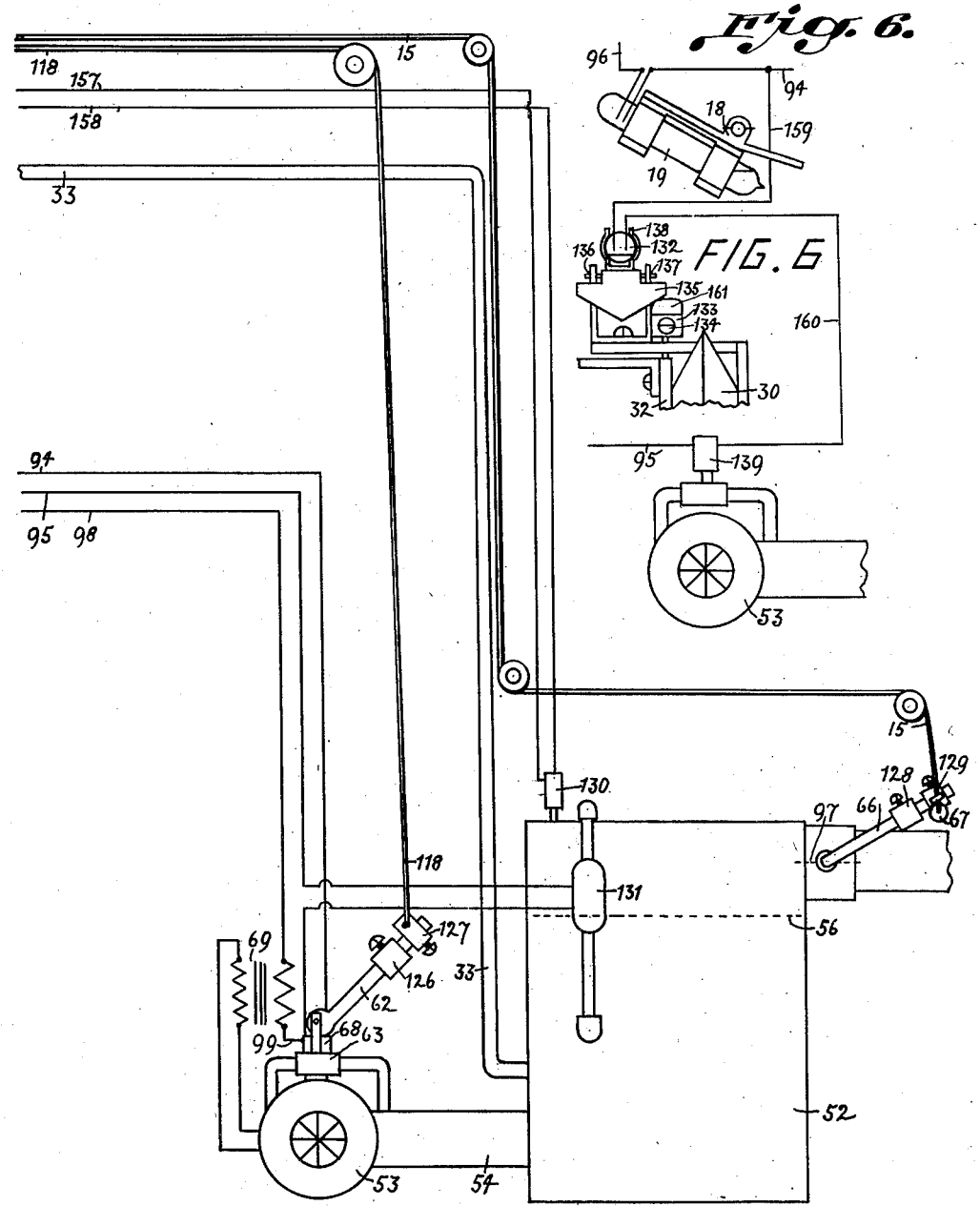
Figure 5 represents alternative forms shown in Figure 2.
Figure 6 represents an alternative form of fuel control.
Figures 8, 9:
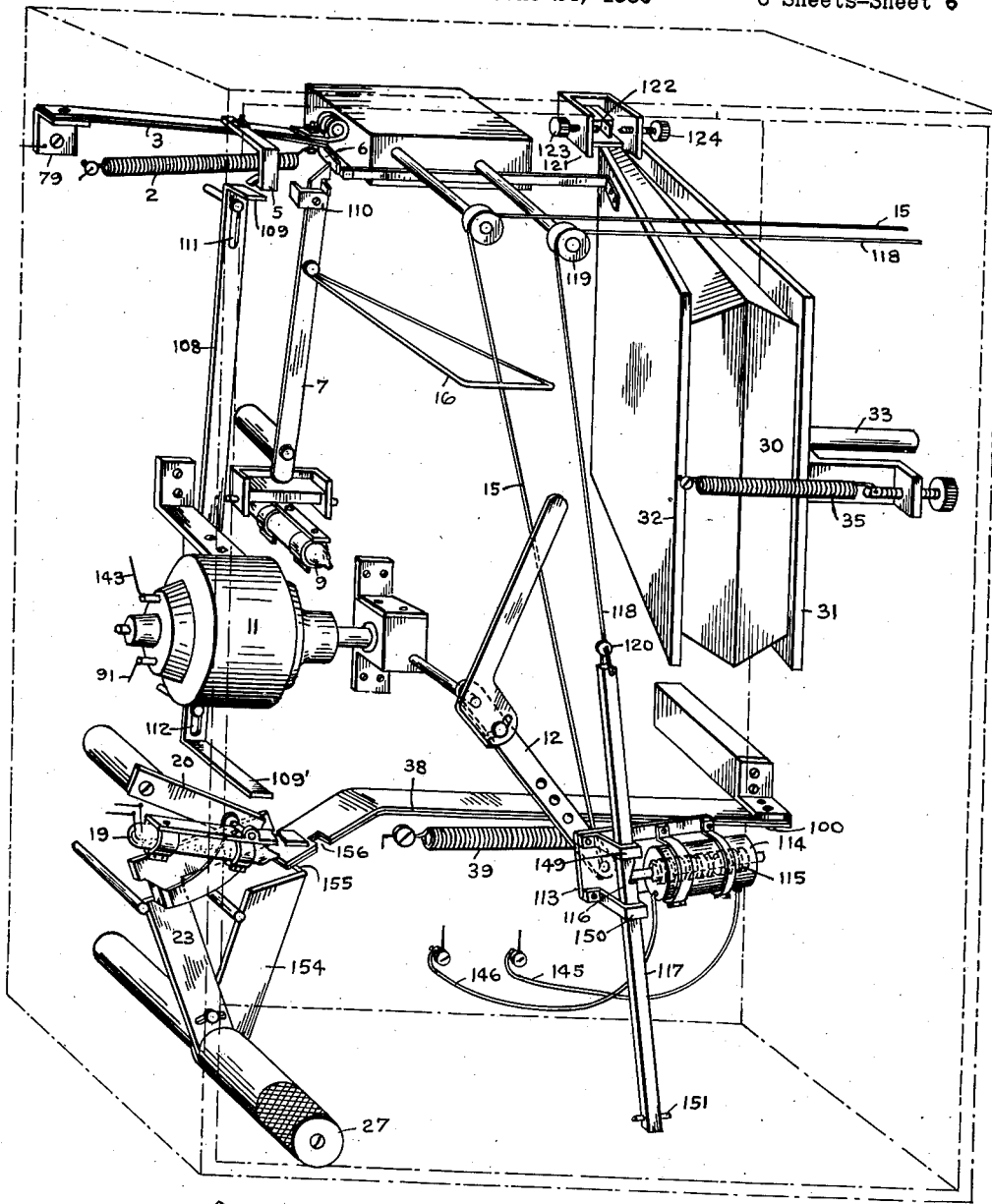
Figure 8 is a perspective view of the appliance diagrammatically shown in Figure 4.
Figure 9 is a perspective view of parts shown in the upper-left-hand corner of Figure 8.

In Figure 5 the burner and damper controls are shown in their operated positions and pipe 33 is shown connected to boiler 52 in an alternative manner, namely to the combustion chamber direct, instead of to air entry tube 54 as in Figure 2. The combined counterweight and wire guide 61 of Figure 2, is shown divided into counterweight 126 and wire guide 127. This is a preferable way, as it allows the length of stroke of lever 62 to be adjusted, independently of the weight, which in turn can be adjusted to the point on lever 62 which is necessary to close valve 63 by the gravity fall of lever 62. In the same way damper lever 66 is shown equipped with counterweight 128 and wire guide 129. The same counterweight 67 is used on wire 15 as in Figure 2, though it has been eliminated from the wire passing through wire guide 127 and wire 118 is fastened rigidly to the guide through an eye. Steam pressure control 130 and low-water cut-off 131 are of standard manufacture, well known in the art and are not a part of the present invention.

In Figure 6 is shown how instead of using a lever controlled fuel valve, such as 63, an ordinary electric controlled valve, of any standard make, may be employed. It also discloses a preferred manner of controlling mercury switch 36, as shown in Figure 1. Mercury switch 19 is shown mounted in tilting piece 18 and connected to wire 96, as in Figure 1. Mounted on the top of bellows 30, similarly to the switch shown in Figure 4, is mercury switch 132. The top part only of side 32 of bellows 30 is shown and on the top pivot is mounted angle piece 133, which is adjusted by screw 134 so that the top horizontal part of angle piece 133, when the bellows is deflated, rests, as shown, against the side of the V shaped front of tilting piece 135. Tilting piece 135 is pivoted at 136 and 137 and moves freely thereon. Mercury tube 132 is so placed in clip holder 138, that in the position shown of bellows 30, the mercury is away from the contacts. An electrically controlled valve 139, not a part of the present invention, is placed in the fuel line, instead of valve 63.

Having detailed the parts of the invention, its operation will now be described. Figure 2 of the drawings should be laid to the right of Figure 1, joining the two together. When the area controlled by thermostat 1 needs heat, the thermostat contacts close and a circuit is closed over the following path: lower contact of thermostat 1, wire 76, secondary of transformer 4, wire 77, center contact of switch 28, upper contact of same, wire 78, angle piece 79, bimetallic strip 3, heating coil 2, wire 80 and upper contact of thermostat 1, completing the circuit.

Wires 81 and 82 are connected to a 110 volt alternating current source and a circuit can be traced through the latter over the following path: wires 81 and 83, primary of transformer 4; wires 84, 85 and 82 and said source. The current in this circuit produces current in the secondary of transformer 4 and this current heats coil 2 and strip 3 distorts downwards. As bracket 5 descends, its bottom offset releases the lug on lever 7 engaged therewith and lever 7 falls by gravity to the left as far as wire 15 passing through loop 16 allows it to. This removes the lower end of lever 7 from piece 10 and mercury switch 9 tilts downward, which closes a circuit over the following path: right contact of mercury switch 9, wires 86 and 89, heating coil 39, wire 90, motor 11; wires 91, 92 and 81; the alternating current source; wires 82, 85 and 93; left contact of mercury switch 9, completing the circuit. The current flowing through this circuit heats coil 39, operates motor 11 and arm 12 slowly revolves to the left, pulling wire 15 downward. Arm 17 also moves to the right and immediately releases the end of tilting piece 18 with which it was engaged. The left end of mercury switch 19 tilts downward, closing a circuit over the following path: right contact of mercury switch 19, wire 94, the blower fan and oil pump motor of burner 53; wires 95, 92 and 81, source of current, wires 82 and 96, left contact of mercury-switch 19, completing the circuit and starting the fan and oil pump in burner 53.

As arm 17 trips off piece 18 immediately motor 11 starts and before wire 15 has been pulled down appreciably, when the fan of burner 53 starts damper lever 66 has not moved upward and damper 97, shown by dotted lines, will not start to open until counterweight 67 is pulled up against counterweight 65. Starting with the damper closed in this manner provides practically no starting load on the motor of burner 53, as no air is rushing through the blower fan, it also builds up pressure in bellows 30, through pipe 33.

When bellows 30 expands, due to this built up pressure, the insulated end of arm 34 swings in front of and passes beyond latch 6, which is now occupying its down position, as shown by the dotted lines. The distortion of strip 3, the expansion of bellows 30 and the position of latch 6 are all shown clearly in Figure 4. Mercury switch 36 has been tilted by the expansion of bellows 30 and a circuit is closed over the following path: right contact of mercury switch 36, wire 98, primary of transformer 69; wires 99, 95, 92 and 81; source of current; wires 82, 85 and 93; left contact of mercury switch 9, right contact of same, wire 86 and left contact of mercury switch 36, completing the circuit, energizing the secondary of transformer 69 and producing the required spark in front of the spray nozzle in the combustion chamber of boiler 52, in a manner well known in the art and not necessary to describe herein.

Timed so that the spark is on and damper 97 only partly open, the ascending wire 58 engages counterweight 64 with counterweight 61 and oil valve 63 begins to open slowly. By the time the oil starts from the nozzle, the combustion chamber has been scavenged of any gases, filled with fresh air of greater oxygen content, thereby aiding proper ignition. The oil valve and damper now open together and the flame is started with reduced fuel and air, therefore ignition is easier and surer, thereby eliminating the roar and bang with which most liquid fuel burners start. This slow starting also prevents the formation of carbon and soot, which only comes from a lack of proper air and oil mixture when the oil spray and air stream start off full blast. Oil valve 63 and damper 97 will be fully open when arm 12 of motor 11 has reached the position shown by dotted lines and wire 15 has been pulled down to the position also shown by a dotted line. This movement of wire 15 moves lever 7 to the position shown by dotted lines, as wire 15 passes through loop 16 which in turn is attached to lever 7. This movement causes piece 10 to be raised and mercury switch 9 tilts upward, opening the circuits closed through it, and stopping motor 11.

Switch lever 7 is stopped by latch 6, which normally swings free, as the insulated end of arm 34 which passed the front of latch 6 when damper 97 was closed, has swung back to its normal operating position immediately in front of the latch, due to the pressure reduction caused by the opening fully of damper 97 and the pressure which is sustained in the combustion chamber of boiler 52 as long as flame is present. The ignition spark is extinguished as mercury switch 9 has opened the circuit through transformer 69. The operating positions of the instrumentalities mentioned are shown clearly in Figures 4 and 5.

When the controlled area has been sufficiently heated, thermostat 1 opens its contacts and current ceases to flow through heat-coil 2 and strip 3 starts to cool off and move upward. As soon as latch 6 disengages arm 34, lever 7 is released and falls by gravity to the right, passing behind arm 34. Mercury switch 9 is again tilted, motor 11 is again started and lever 7 and arms 12 and 17 are returned to their normal positions. Arm 17 does not tilt piece 18 upward until the slackening of wire 58 has first lowered counterweight 64, thereby allowing counterweight 61 to close oil valve 63. After a few seconds has elapsed damper 97 is closed by counterweight 65, as counterweight 67 is lowered by the slackening of wire 59. In this way the combustion chamber is scavenged after the fuel supply has been cut off, as the fan motor is still operating until damper 97 is completely closed. Any oil trickling out of the spray nozzle after the oil valve is closed is properly consumed, evading the smoky flame, soot and fumes commonly found in oil burners from this oil trickle. The fan motor is stopped when arm 17 tilts piece 18 upward, causing mercury switch 19 to open its contacts.

The various safety features will now be described. If the blower fan, during the starting cycle, for any reason whatever, does not produce the required air in the combustion chamber of boiler 52, then bellows 30 will not expand sufficiently to move arm 34 so that it will engage latch 6 or pass beyond it and lever 7 falls to the right to close the switch 9 and start the motor 11 whereby the oil valve is first closed and then the damper and finally the fan motor is stopped. However, in this case strip 3 is still distorted downward and stop 5 does not engage lever 7 and the normal starting operation is repeated. If the air trouble has not been cleared by the short shut-down, the process is repeated. No oil can be ignited in the combustion chamber as the sparking transformer current passes through mercury switch 36, which only closes its contacts when bellows 30 is expanded. As prevention of this improper burning of fuel oil, for a few seconds during this starting cycle, is the only function of mercury switch 36, it can be dispensed with if desired and wire 86 connected directly to wire 98. Ignition current will still be cut off after starting, as the circuit still passes through mercury switch 9.

The circuit for motor 11 was traced through heating coil 39 and bimetallic strip 38 is so adjusted that it does not distort upward noticeably due to the heating effect caused by one part revolution of arm 12 of motor 11, though it does so distort by any predetermined number of part revolutions. This predetermined number is arranged for by varying the tension on strip 38 by tightening or loosening adjusting screw 100. Therefore, when the predetermined revolutions of arm 12 have been made, the bent end of strip 38 forces upward and to the left, the engaged lug on the upper edge of the horizontal member of angle 23. This motion moves lug 22 to the left and piece 20 drops down when the curved pointed foot clears lug 22, opening the circuit through mercury switch 19 and shutting down burner 53. The relative position of the parts is shown clearly in Figure 4. As piece 20 falls, the insulating button on its top releases its pressure on the center contact spring of switch 28 and this spring, disengaging the upper contact now engages the lower one. This action opens the circuit through heating coil 2 and strip 3 cools off, distorts upward and checks lever 7 against stop 5, thereby stopping the recycling operation of motor 11. A circuit is also closed that can be traced as follows: bottom contact of switch 28, wire 101, bell or buzzer 102, wire 103, secondary of transformer 4, wire 77 and center contact spring of switch 28, completing the circuit. Bell or buzzer 102 is operated by the current in this circuit and signals a burner shut-down. If air trouble develops after combustion has actually taken place, then bellows 30 instantly collapses, arm 34 releases latch 6 and the burner shuts-down and re-cycles, as described.

Frequently the air inlet on burner blower fans becomes temporarily clogged by a piece of paper sucked up, a fan blade can be broken or motor trouble slows down the fan, thereby reducing the volume of air in the combustion chamber and producing a smoky and dangerous flame. This cannot occur when my invention is used. As well as the air inlet being affected adversely, sometimes the air outlet from the combustion chamber becomes clogged or stopped. This might come from the accidental closing of a damper in the breeching, stoppage in the flue or chimney, or from other causes. This is highly dangerous as it means that the flame in the combustion chamber bursts out into the area where the boiler is installed and produces a fire hazard, as well as filling the premises with a smoky rain of soot. When my system is used this cannot happen as a closed or even partly closed outlet from the combustion chamber, immediately increases the air pressure in bellows 30 and the insulated end of arm 34 moves from engagement with latch 6 and passes beyond it, latch 6 swings upward, lever 7 falls to the right and the burner shuts-down as described.

Another source of liquid fuel burner trouble is caused by a temporary stoppage in the fuel pipe, generally by sediment clogging the spray nozzle orifice. The stoppage of the flow of oil at once extinguishes the flame and then the oil pressure removes the obstruction and the oil sprays out again in the combustion chamber without any regular ignition means being present. If the burner is installed in a combustion chamber with a refractory lining and it has been operating for a comparatively long time, this lining may be hot enough to re-ignite the fuel spray. Often the refractory is not hot enough for such re-ignition and before the time interval flame control shuts down the burner, the combustion chamber, breeching, and even the flue, become filled with oil mist or vapor. This oil is diffused with the air still coming from the blower fan and finally the retained heat in the combustion chamber brings the oil up to the flash point and the whole thing explodes; often destroying the boiler and setting the premises on fire. If the burner only started operation shortly before the oil trouble developed and the combustion chamber was not hot enough to bring the oil to the flash point, the oil and air mixture remains in the combustion chamber, breeching and flue when the time interval flame control shuts-down the burner. If the burner is started again automatically or manually, before the natural draft through the flue has removed this air and oil mixture, the explosion and fire hazard is still present. This is why most fuel oil burners are installed without automatic re-cycling in case of a shut-down; the natural draft is relied on to clear the system of oil and air mixture, before the one in charge discovers the shut-down and re-starts the burner manually. This is also why shut-down alarms are not installed. My invention controls these fuel dangers in the following simple manner: The instant the flame is extinguished, the air pressure in the combustion chamber changes, this causes a corresponding pressure change in air entry tube 54, tube 33 and bellows 30. Spring 35 is so adjusted that this change in pressure causes bellows 30 to partly contract and thereby remove the insulated end of arm 34 from engagement with latch 6, thereby re-cycling or shutting down the burner as already described. This sudden change in air pressure in the combustion chamber is due to the fact that any given blower fan has a different load upon it when combustion is taking place than when there is no load present. When flame is present the volume of air which has been passed through the blower fan is greatly increased, due to heat expansion in the vicinity of the flame and this causes a change in pressure on the blower fan. Also, the flame itself and the moving products of combustion exert an increased frictional effect on the air passing through to the flue and this is reflected in a change in air pressure. Any device, such as bellows 30, if designed and built to operate on slight pressure changes, can translate these pressure changes into mechanical movements. Even due to the slight pressure changes entailed in the uneven burning of the normal liquid fuel supply, bellows 30 will oscillate in consonance with the flame variations. However, this does not disengage arm 34 from latch 6, though bellows 30 can be adjusted so any predetermined variation, above or below the normal supply of air or fuel, will disengage arm 34 and latch 6. The length of arm 34 is such that very small movements of side piece 32 moves it to one of its three positions.

Another fuel supply trouble occurs when the clogging in the fuel line is only partial. If it occurs when the burner starts, ignition does not take place and again there is an accumulation of explosive matter. If the partial stoppage has cleared itself when the burner is re-started and ignited normally, the mentioned hazard is again present. If the partial stoppage occurs during normal combustion, the fuel is not properly atomized, burns with a smoky and sooty flame, but as the heat produced is sufficient to prevent the flame control from shutting down the burner, this condition continues. Instead of a reduced fuel supply, the latter is often accidentally increased, and added to all the cited hazards is that of too rapid increase in steam or water pressure. The simple air scavenging and combustion pressure control system described herein, positively prevents any danger from these reduced or increased fuel supplies, as well as reduced or increased air supply, inasmuch as all these troubles change the combustion chamber air pressure.

As well as preventing danger from abnormal combustion conditions, means must also be provided for preventing excessive steam or water pressure. In the present invention this is done in the following manner: Low-water cut-off 40 comprises expansible bellows 41 and 42, and as pressure increases in the boiler, header 43 moves to the left; and stud 104, and the corresponding stud on the other side, slide in their slots in forked piece 46, the movement controlled by adjustable spring 47. When adjustable screw 105 comes into contact with and pushes to the left, the lug at the bottom of angle 29, the insulating piece on the end of the upper arm forces upward the top contact spring of switch 28 and thereby opens the thermostat circuit, as already described. When the steam or water pressure falls, spring 47 pulls header 43 to the right and the circuit is again closed through switch 28. The usual time differential in steam pressure controls, between the time the burner is shutdown and allowed to start again, is obtained in the present invention by the time interval involved in the time it takes for strip 3 to release lever 7, after switch 28 has been opened, thereby allowing angle 29 to force up the upper contact a considerable distance, as the steam pressure will rise until the burner finally shuts down. Also, when the steam pressure falls, after the shut-down, and the contacts re-engage, another time interval is involved in reheating strip 3, before the burner can be re-started.

As a safeguard against high steam or water pressure that might occur should the windings of motor 11 or heating coil 39 burn out, while the control device was in its burner operating position, angle 23 is provided with adjusting screw 106. This screw is so adjusted that header 43 comes in contact with it at a higher pressure than that set for the shut-down controlled by screw 105. Therefore, if the burner does not shut-down within the described time interval, angle 23 is forced to the left and piece 20 tripped, stopping the burner and sounding the alarm, as already described.

Another ever present danger in the use of fluid fuel burners is that of low-water in the boiler, due to leaks or evaporation. When a boiler is fired by hand, such lack of water is quickly noted. When an automatic device is used, the one in charge never goes near the boiler unless trouble occurs. Many oil burners are installed without such a cut-off, automatically operated when the boiler water becomes low, on account of the expense entailed in their installation. To overcome this latter and make it obligatory to have such an essential automatic control, I have incorporated it as an integral part of the one control unit, without appreciably adding to expense. Connected as described, low-water cut-off 40 will remain full of water, as long as the water in the boiler remains above the low water line shown at 56. As the boiler water approaches this line, the water in header 43 and bellows 41 and 42 flows back to the boiler and when the predetermined level is reached, header 43, being sufficiently relieved of the weight of the contained water, is forced upward by the contracting action of spring 47 pulling on cord 51 which passes over roller 50 to its anchorage on pipe 45. Due to the leverage exerted by the projecting ends of the prongs of forked piece 46 on their fulcrums, stud 107 and corresponding stud on the other side, header 43 rises and its left end comes in contact with the lug on the lower side of the horizontal arm of angle 23 and the latter is forced to the left, tripping piece 20 and shutting down the burner, as already described. This lifting effect of header 43 is exerted, regardless of possible simultaneous steam pressure, as the force is transmitted to stud 104 and its companion on the other side, regardless of the position of these studs in their slots.

Whenever piece 20 is tripped, which only occurs when some trouble which cannot be overcome by re-cycling is present, the burner is shut-down and cannot be started again until piece 20 and angle 23 is reset by hand, by the turning of button 27 clockwise. This prevents another of the dangers found in ordinary boiler controls; namely, when a low-water cut-off of the float valve type is used and the water in the boiler reaches the cut-off point during operation of the burner, the returning condensation water in a steam system raises the water level sufficiently to raise the float, which starts the burner again which is quickly stopped when the returned water has again vaporized. These frequent stoppings and startings, when the water level is low, seriously overheat the boiler and can cause damage thereto. In my invention, not only is this prevented, but the burner cannot even be re-started manually without first bringing the boiler water up to its proper level, as the upraised header 43 prevents the upper arm of angle 23 taking its normal position.

That part of Figures 4 and 5, which show alternative operating means will now be described. Figure 5 should be placed at the right of Figure 4, so that the numbered items on their left and right margins connect together.

When the hereinbefore described safety means is used, each time the control re-cycled, a small amount of fuel is injected into the combustion chamber. While this fuel could not be ignited if the proper air conditions were not present, as the ignition circuit is open in that case, and the air stream before and after opening the fuel valve clears out the fuel vapor or mist so formed; nevertheless this alternative form prevents the injection of this small amount of fuel. Only those circuits which have been changed will be traced and described, all others remaining as in Figures 1 and 2.

Assume Figure 4 to represent the control as having re-cycled for the predetermined number of times and bimetallic strip 38 has distorted upward and has just forced angle 23 to the left, thereby opening the circuit of the burner blower fan motor, as described. The next step will be the collapse of bellows 30, which has not yet occurred. In Figure 1 strip 38 was heated by coil 39 which was connected in series with motor 11 and should either the coil or the motor burn out the other would be inoperative. In Figure 4 each of these instrumentalities is in a separate circuit. When mercury tube 9 is tilted downward a circuit is closed that can be traced as follows: right contact of mercury switch 9, wires 140 and 141, heating coil 39, primary of transformer 125, wire 142 and over the already traced circuit back to switch 9. Another circuit is closed which can be traced as follows: right contact of mercury switch 9, wire 143, motor 11; wires 91, 92 and 81; back over the circuit already traced, thereby starting motor 11. Still another circuit can be traced from the right contact of mercury switch 9; wires 140 and 98; and then over the ignition circuit already traced. Therefore, whenever mercury switch 9 is tilted, transformers 69 and 125 are energized and motor 11 operated. When bellows 30 collapses, arm 34 disengages latch 6 and the contact carried by arm 122 of switch 121, which moves with side 32 of bellows 30, engages the contact on screw 124 and a circuit is closed which can be traced as follows: screw 124, wire 144, flexible cord 145, solenoid 114, flexible cord 146, secondary of transformer 125; wires 147 and 148, and contact on arm 122, completing the circuit. Solenoid 114, due to the current in this circuit, immediately withdraws its plunger from latch 116 in square rod 117 and the latter is pulled upward, through two guides 149 and 150, by the pull exerted on wire 118 by the weight of lever 62 and counterweight 126 of oil valve 63, thereby instantly and completely cutting off the fuel from burner 53. The length of rod 117 below guide 150 is such that cotter pin or stop 151 does not strike guide 150 when so released. As arm 12 of motor 11 revolves, latch device 113 slides freely up on rod 117, on account of guides 149 and 150, the latch device and rod 117 taking their normal positions, as shown by the dotted lines. Lever 7, when moved to the left by wire 15, is checked by lug or stop 109, which was lowered in front of lug 110 on lever 7, when piece 20 fell. This prevents the idle revolving of arm 12, until strip 3 has cooled off and checked lever 7 with stop 5, as happened with the form shown in Figure 1. When angle 23 is reset, piece 20 on resuming its normal position, forces up emergency cut-off strip 108 and leaves lever 7 engaged with stop 5, if strip 3 has cooled off sufficiently before the resetting takes place. It will be noted that due to its pivot mounting, solenoid 114 will always be at right angles to rod 117, no matter what the position of arm 12 may be.

In Figure 1, mercury switch 36, controlled by bellows 30, opened the ignition circuit in case of trouble. Switch 121 is substituted for it in Figure 4 and it controls a circuit which controls oil valve 63, leaving the ignition circuit to be controlled by mercury switch 9 alone. As bellows 30 expands and contracts on very slight pressure changes, switch 121 offers less resistance to its movements and its use is an advantage. The only purpose in using transformer 125 is to reduce the voltage on the open contacts of switch 121 and through the windings of solenoid 114. It can be dispensed with and the switch and solenoid designed for higher voltage.

Another circuit was made operative by the tilting of mercury switch 9 and it can be traced as follows: right terminal of secondary of transformer 125; wires 147 and 152; buzzer 102 connected thereto, wire 153 and left terminal of the secondary, completing the circuit. The current passing through the buzzer gives a signal which lasts for the time it takes arm 12 to make its part revolution. In case of re-cycling the continued sounding of this signal indicates that some burner trouble exists. This signal means varies from that disclosed in Figure 1, though both alarm circuits can be used, if desired through the one buzzer.

Attached to angle 23 is an adjustable piece 154, with a pin 155 at its upper point. The end of the piece passes behind strip 38 and pin 155 passes thereunder, but only when strip 38 is distorted upward. When heating coil 39 cools off pin 155 checks the downward motion of strip 38. If the combined steam and low-water cut-off 40 is used and angle 23 is forced to the left thereby, then pin 155 would pass through slot 156, cut in the back of strip 38, as shown by the dotted lines. The only purpose served by piece 154 is to enable the burner user to determine the cause of a shut-down. If strip 38 is found upraised and resting on piece 154, then the shut-down was from combustion trouble. If the low-water cut-off is in its upraised position, the trouble is boiler low-water; and if angle 23 is forced back alone, then the trouble was in the control box itself and must be in the low voltage circuit or in that of motor 11, inasmuch as steam pressure higher than that normally opening the low voltage circuit is the only thing that would have so forced back angle 23. If desired, visible signals on the outside of the control housing, operated by these movements can readily be arranged for, as they all differ from each other.

When latch device 113 is in its normal position, as shown by the dotted lines, and lever 7 falls to the left, the plunger of solenoid 114 is at once pulled in, as arm 122 of switch 121 is in contact with screw 124. The air pressure built up in bellows 30 as soon as the blower fan motor starts disengages these contacts before arm 12 and the latch device have descended to the point on rod 117 where latch portion 116 is cut; consequently, wire 118 begins to be pulled down at this point and oil valve 63 opened as hereinbefore described. This is why wire 118 is fastened directly to wire guide 127 on lever 62, instead of to a counterweight as in Figure 1, the required time interval without oil being obtained by the free motion of latch device 113 down rod 117 to latch 116.

Should air or any other combustion trouble develop, either immediately before or during the starting cycle, then as the circuit would be closed through solenoid 114 by the non-expansion of bellows 30, no fuel is injected into the combustion chamber and latch device 113 merely slides along rod 117 for the complete revolution or re-cycling revolutions, until strip 38 trips angle 23. Should the air pressure in bellows 30 become normal after a cycling operation has begun, then on the next revolution of arm 12, latch device 113 engages rod 117 at the proper time and oil is at once injected in the combustion chamber. Whenever the air pressure in bellows 30 becomes above normal, as described hereinbefore, the contact on arm 122 of switch 121 engages the contact on the end of adjusting screw 123, as arm 34 swings beyond latch 6, and the oil valve 63 is immediately tripped and closed. On this account switch 121 is so adjusted that normal burner operation allows the contacts on arm 122 to just clear screws 123 and 124.

As Figures 4 and 5 also show how my system can be adapted to installations where it is desired to continue the use of already installed steam pressure and low-water cut-off devices, the circuits controlled by a standard steam pressure control 130 and low-water cut-off 131 will now be traced: Wires 157 and 158 divide wire 76 below thermostat 1 and the other ends of these wires connect to steam pressure control 130; consequently, when the predetermined steam pressure is reached, the circuit through heating coil 2 is opened and the normal shut-down takes place. Lever 62 of oil valve 63 is lowered comparatively slowly in this case, as bellows 30 does not collapse, but as there is flame in the combustion chamber, the flame merely slowly dies out. This is the same thing that occurs when thermostat 1 opens the circuit under normal operation. Wire 95, which is the common return of both the fan motor and ignition system of burner 53 is divided and passes through the contacts of low-water cut-off 131. Consequently, when the low water point, shown by dotted line 56, is reached, both of these circuits are immediately opened and as the immediate collapse of bellows 30 closes the circuit through solenoid 114, oil valve 63 is immediately closed. The control device will continue to re-cycle without opening the oil valve until strip 38 distorts upward and trips angle 23 and piece 20. The continued ringing of the alarm buzzer, as the control re-cycles indicates the trouble. Pipe 33 is shown connected directly to the combustion chamber of boiler 52, which is the way it would have to be connected when those burners are used which have no air entry tube, such as 54.

Referring now to Figure 6, as well as showing how a standard electro-magnetic valve may be used in the fuel line, instead of fuel valve 63, an alternative means of operating mercury switch 36 by bellows 30 is also shown. Mercury switch 18 is connected the same as in Figure 1, but a new circuit can be traced from wire 94 through wire 159, mercury tube 132, wire 160, fuel valve 139 and back over the already traced circuit through wire 95. Mercury switch 132, in the position shown, that of a collapsed bellows 30, holds this circuit open. When bellows 30 is inflated, arm 133, which bears a lug 161 which extends forward, turns to the left and lug 161 pressing against the triangular piece of tilting piece 135, raises it and tilts the mercury over the contacts of switch 132. Electro-magnetic valve 139 is opened by the current flowing in this circuit. By means of adjusting screw 134, arm 133 is so adjusted that the center of lug 161 is under the point of the triangular piece when normal combustion is taking place. If the air pressure in bellows 30 increases abnormally, side piece 32 of bellows 30 swings more to the left and arm 133 follows it, tilting piece 135 falls down and mercury switch 132 opens the circuit and electromagnetic valve 139 shuts off the fuel supply. Similarly, when the air pressure is reduced, arm 133 swings to the right and the switch is opened. Current for valve 139 is taken off through mercury switch 19, merely as a precaution, so that in no manner can valve 139 be opened, unless the fan motor of burner 53 is also operating. If solenoid 114 is operated by high voltage current, instead of through transformer 125, then the bellows switch 132 would be substituted for switch 121.

From the foregoing description it will be noted that the only electrical energy consumed by the control system, during operation of the burner, except when valve 139 is used, is the small amount represented by the mild heating of coil 2 and operation of buzzer 102 by low voltage current.

From the description of my invention given, it will be clear that combinations of the parts shown can be made, other than those described herein, without departing from the spirit of the invention. Also, that instead of using bellows 30, any other device which would produce a mechanical movement when influenced by slight pressure changes could be used, and such use is contemplated. It is, therefore, to be understood that the present invention is not limited to its illustrated embodiment, but may be otherwise embodied within the scope of the claims.

Having thus described my invention, what I claim as new is:

1. An automatic electrical control for fuel burning mechanism and a combustion chamber, air and fuel supply means for said chamber, means for controlling the passage of said fuel to said chamber, means to ignite said fuel in said chamber, means directly responsive to pressure changes from said air supply means operable to permit flow of said fuel to said chamber in response to normal pressure and to stop the flow of fuel in response to abnormal pressure from said air supply means without stopping the flow of air therefrom.

2. An automatic electrical control for fuel burning mechanism and a combustion chamber, air and fuel supply means for said chamber, means for controlling the passage of said fuel to said chamber, means to ignite said fuel in said chamber, means directly responsive to pressure changes from said air supply means operable to permit flow of said fuel to said chamber in response to normal pressure and to stop the flow of fuel in response to other than normal pressure from said air supply means, and in combination therewith means for operating sequentially and at predetermined intervals respectively the ignition means, the air supplying means and the fuel supplying means.

3. An automatic electrical control for fuel burning mechanism and a combustion chamber, a damper for opening and closing an outlet in said chamber, air and fuel supply means for said chamber, means for controlling the passage of said fuel to said chamber, means to ignite said fuel in said chamber, means directly responsive to pressure changes from said air supply means operable to permit flow of said fuel to said chamber in response to normal pressure and to stop the flow of fuel in response to other than normal pressure from said air supply means, and in combination therewith means for operating sequentially and at predetermined intervals respectively the ignition means, the air supplying means and the fuel supplying means.

4. An automatic electrical control for fuel burning mechanism and a combustion chamber, air and fuel supply means for said chamber, means for controlling the passage of said fuel to said chamber, means to ignite said fuel in said chamber, means directly responsive to pressure changes from said air supply means operable to permit flow of said fuel to said chamber in response to normal pressure and to stop the flow of fuel in response to other than normal pressure from said air supply means, and in combination therewith means for operating sequentially and at predetermined intervals respectively the ignition means, the air supplying means and the fuel supplying means, and means comprising said means directly responsive to pressure changes from said air supply means for repeating said last-mentioned series of operations when ignition of said fuel is not effected upon said first series of operations.

5. An automatic electrical control for fuel burning mechanism and a combustion chamber, air and fuel supply means for said chamber, means for controlling the passage of said fuel to said chamber, means to ignite said fuel in said chamber, means directly responsive to pressure changes from said air supply means operable to permit flow of said fuel to said chamber in response to normal pressure and to stop the flow of fuel in response to other than normal pressure from said air supply means, and in combination therewith means for operating sequentially and at predetermined intervals respectively the ignition means, the air supplying means and the fuel supplying means, means comprising said means directly responsive to pressure changes from said air supply means for repeating said last-mentioned series of operations when ignition of said fuel is not effected upon said first series of operations, and means for preventing a repetition of said last series of operations after a predetermined time.

6. An automatic electrical control for fuel burning mechanism and a combustion chamber, air and fuel supply means for said chamber, means for controlling the passage of said fuel to said chamber, means to ignite said fuel in said chamber, means directly responsive to pressure changes from said air supply means operable to permit flow of said fuel to said chamber in response to normal pressure and to stop the flow of fuel in response to other than normal pressure in said chamber, and in combination therewith means for operating sequentially and at predetermined intervals respectively the ignition means, the air supplying means and the fuel supplying means, means for repeating said last-mentioned series of operations when ignition of said fuel is not effected upon said first series of operations, means for preventing a repetition of said last series of operations after a predetermined time, and means for producing an alarm when preventing further repetition of said operations.

7. An automatic electrical control for fuel burning mechanism and a combustion chamber, a damper for opening and closing an outlet in said chamber, air and fuel supply means for said chamber in operative relation to said damper, means for controlling the passage of said fuel to said chamber, means to ignite said fuel in said chamber, means directly responsive to pressure changes from said air supply means operable to permit flow of said fuel to said chamber in response to normal pressure and to stop the flow of fuel in response to other than normal pressure from said air supply means, and in combination therewith means for first discontinuing said fuel, and then closing said damper and shutting off said air supply means, when operation has been discontinued.

8. An automatic electrical control for fuel burning mechanism and a combustion chamber, a damper for opening and closing an outlet in said chamber, air and fuel supply means for said chamber in operative relation to said damper, means for controlling the passage of said fuel to said chamber, means to ignite said fuel in said chamber, means directly responsive to pressure changes from said air supply means operable to permit flow of said fuel to said chamber in response to normal pressure and to prevent the flow of fuel in response to any interference in the supply of air to said chamber and for first discontinuing said fuel and thereafter closing off said air and for closing the damper when operation has ceased.

9. An automatic electrical control for fuel burning mechanism and a combustion chamber, a damper for opening and closing an outlet in said chamber, air and fuel supply means for said chamber in operative relation to said damper, means for controlling the passage of said fuel to said chamber, means to ignite said fuel in said chamber, means directly responsive to pressure changes from said air supply means operable to permit flow of said fuel to said chamber in response to normal pressure and to stop the flow of fuel in response to other than normal pressure from said air supply means, and in combination therewith means for operating sequentially and at predetermined intervals respectively the ignition means, the air supplying means and the fuel supplying means, means for repeating said last-mentioned series of operations when ignition of said fuel is not effected upon said first series of operations, and means for preventing a repetition of said last series of operations after a predetermined time, and in combination therewith means for first discontinuing said fuel and then closing said damper and shutting off said air supplying means, when operation has been discontinued.

10. In combination, a combustion chamber, means for supplying fuel to said chamber, means including a duct for supplying air to said chamber, fuel igniting means in said chamber, means to initiate and discontinue the supply of fuel to said chamber, control means operative cyclically to energize said ignition means, start said air supply means and initiate fuel flow to said chamber in one-half cycle and operative to discontinue fuel flow, stop said air supply means and de-energize said ignition means in the other half cycle, and means responsive to pressure variation in said duct to interrupt said cycle at the end of the first half thereof upon establishment of combustion in said chamber and cause completion of said second half cycle upon combustion failure.

11. In combination, a combustion chamber, means for supplying fuel to said chamber, means including a duct for supplying air to said chamber, fuel igniting means in said chamber, means to initiate and discontinue the supply of fuel to said chamber, control means operative cyclically to energize said ignition means, start said air supply means and initiate fuel flow to said chamber in one-half cycle and operative to discontinue fuel flow, stop said air supply and de-energize said ignition means in the other half cycle, means responsive to pressure variation in said duct to interrupt said cycle at the end of the first half thereof upon establishment of combustion in said chamber and cause completion of said second half cycle upon combustion failure, and means responsive after continuous operation of said control means through a predetermined number of cycles following fuel ignition failure to discontinue operation of said control means at the end of one of said cycles.

12. In combination, a combustion chamber, means for supplying fuel to said chamber, means including a duct for supplying air to said chamber, fuel igniting means in said chamber, means to initiate and discontinue the supply of fuel to said chamber, control means operative cyclically to energize said ignition means, start said air supply means and initiate fuel flow to said chamber in one-half cycle and operative to discontinue fuel flow, stop said air supply means and de-energize said ignition means in the other half cycle, means responsive to pressure variation in said duct to interrupt said cycle at the end of the first half thereof upon establishment of combustion in said chamber and cause completion of said second-half cycle upon combustion failure, electrically operated driving means for said control means, and a thermal relay controlled switch operative to control energization of said driving means.

13. In combination, a combustion chamber, means for supplying fuel to said chamber, means including a duct for supplying air to said chamber, fuel igniting means in said chamber, means to initiate and discontinue the supply of fuel to said chamber, control means operative cyclically to energize said ignition means, start said air supply means and initiate fuel flow to said chamber in one-half cycle and operative to discontinue fuel flow, stop said air supply means and de-energize said ignition means in the other half cycle, means responsive to pressure variation in said duct to interrupt said cycle at the end of the first half thereof upon establishment of combustion in said chamber and cause completion of said second half cycle upon combustion failure, electrically operated driving means for said control means, a thermal relay controlled switch operative to control energization of said driving means, and electrically controlled means in series with said switch operative after a predetermined number of cycles of operation of said control means following fuel ignition failure to discontinue operation of said control means at the end of one of said cycles.

14. In combination, a combustion chamber having a damper controlled outlet, means for opening and closing the damper, means for supplying fuel to said chamber, means including a duct for supplying air to said chamber, fuel ignition means in said chamber, means to initiate and discontinue the supply of fuel to said chamber, control means operative cyclically to energize said ignition means, open said damper, start said air supply means and initiate fuel flow to said chamber sequentially and at predetermined intervals respectively in one-half cycle and operative to discontinue fuel flow, stop said air supply means, de-energize said ignition means and close said damper sequentially and at predetermined intervals respectively in the other half cycle, and means responsive to pressure variation in said duct to interrupt said cycle at the end of the first half thereof upon establishment of combustion in said chamber and cause completion of said second-half cycle upon combustion failure.

15. In combination, a combustion chamber having a damper controlled outlet, means for opening and closing the damper, means for supplying fuel to said chamber, means including a duct for supplying air to said chamber, fuel ignition means in said chamber, means to initiate and discontinue the supply of fuel to said chamber, control means operative cyclically to energize said ignition means, open said damper, start said air supply means and initiate fuel flow to said chamber sequentially and at predetermined intervals respectively in one-half cycle and operative to discontinue fuel flow, stop said air supply means, de-energize said ignition means and close said damper sequentially and at predetermined intervals respectively in the other half cycle, means responsive to pressure variation in said duct to interrupt said cycle at the end of the first half thereof upon establishment of combustion in said chamber and cause completion of said second-half cycle upon combustion failure, and means responsive after operation of said control means through a predetermined number of cycles following fuel ignition failure to discontinue operation of said control means at the end of one of said cycles.

16. A device of the character described comprising a member distortable by heat, electrical heating means associated therewith, a thermostat in series with said electrical heating means controlling the supply of electrical energy to said heating means, a self-closing switch held open by means including said distortable member in either of two positions thereof and releasable upon movement of said member from either of such positions, electrically-operated means controlled by said switch, means associated with said last-named means for restoring said switch to open position after release to closed position by movement of said distortable member, a combustion chamber, means for supplying air and oil to said combustion chamber, electrical means for igniting the mixture of oil and air, means controlled by said electrically-operated means to energize said air and oil supply means, a valve for said oil supply means controlled by said electrically-operated means, a circuit including said self-closing switch and igniting means, means responsive to pressure variation in said combustion chamber to render operative or inoperative the means for holding open said switch in one position of said distortable member, and means responsive to continued current flow through said switch to open the circuit between said thermostat and electrical heating means.

17. A device of the character described comprising a member distortable by heat, electrical heating means associated therewith, a thermostat in series with said electrical heating means controlling the supply of electrical energy to said heating means, a self-closing switch held open by means including said distortable member in either of two positions thereof and releasable upon movement of said member from either of such positions, electrically-operated means controlled by said switch, means associated with said last-named means for restoring said switch to open position after release to closed position by movement of said distortable member, a combustion chamber, means for supplying fuel to said chamber, means including a duct for supplying air to said chamber, fuel igniting means in said chamber, means to initiate and discontinue the supply of fuel to said chamber, control means controlled by said switch and operative cyclically to energize said ignition means, start said air supply means and initiate fuel flow to said chamber sequentially and at predetermined intervals in one-half cycle and operative to discontinue fuel flow, stop said air supply means and de-energize said ignition means sequentially and at predetermined intervals respectively in the other half cycle, and means responsive to pressure variation in said duct to interrupt said cycle at the end of the first half thereof upon establishment of combustion in said chamber and cause completion of said second-half cycle upon combustion failure.

18. A device of the character described comprising a member distortable by heat, electrical heating means associated therewith, a thermostat in series with said electrical heating means controlling the supply of electrical energy to said heating means, a self-closing switch held open by means including said distortable member in either of two positions thereof and releasable upon movement of said member from either of such positions, electrically-operated means controlled by said switch, means associated with said last-named means for restoring said switch to open position after release to closed position by movement of said distortable member, a combustion chamber, means for supplying fuel to said chamber, means including a duct for supplying air to said chamber, fuel igniting means in said chamber, means to initiate and discontinue the supply of fuel to said chamber, control means controlled by said switch and operative cyclically to energize said ignition means, start said air supply means and initiate fuel flow to said chamber sequentially and at predetermined intervals in one-half cycle and operative to discontinue fuel flow, stop said air supply means and de-energize said ignition means sequentially and at predetermined intervals respectively in the other half cycle, means responsive to pressure variation in said duct to interrupt said cycle at the end of the first half thereof upon establishment of combustion in said chamber and cause completion of said second-half cycle upon combustion failure, and means responsive after operation of said control means through a predetermined number of cycles following fuel ignition failure to discontinue operation of said control means at the end of one of said cycles.

19. A device of the character described comprising a member distortable by heat, electrical heating means associated therewith, a thermostat in series with said electrical heating means controlling the supply of electrical energy to said heating means, a self-closing switch held open by means including said distortable member in either of two positions thereof and releasable upon movement of said member from either of such positions, electrically-operated means controlled by said switch, means associated with said last-named means for restoring said switch to open position after release to closed position by movement of said distortable member, a combustion chamber, means for supplying fuel to said chamber, means including a duct for supplying air to said chamber, fuel igniting means in said chamber, means to initiate and discontinue the supply of fuel to said chamber, control means controlled by said switch and operative cyclically to energize said ignition means, start said air supply means and initiate fuel flow to said chamber sequentially and at predetermined intervals in one-half cycle and operative to discontinue fuel flow, stop said air supply means and de-energize said ignition means sequentially and at predetermined intervals respectively in the other half cycle, means responsive to pressure variation in said duct to interrupt said cycle at the end of the first half thereof upon establishment of combustion in said chamber and cause completion of said second half cycle upon combustion failure, and electrically-controlled means in series with said self-closing switch responsive after a predetermined number of cycles of operation of said control means following fuel ignition failure to discontinue operation of said control means at the end of one of said cycles.

HUBERT S. TURNER.